(12) United States Patent
Samuelsson et al.

(10) Patent No.: US 9,973,760 B2
(45) Date of Patent: May 15, 2018

(54) EXTENSION DATA HANDLING

(71) Applicant: Telefonaktiebolaget LM Ericsson (publ), Stockholm (SE)

(72) Inventors: Jonatan Samuelsson, Stockholm (SE); Rickard Sjöberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/371,819

(22) Filed: Dec. 7, 2016

(65) Prior Publication Data

US 2017/0094276 A1  Mar. 30, 2017

Related U.S. Application Data

(63) Continuation of application No. 13/818,488, filed as application No. PCT/SE2012/051477 on Dec. 21, 2012.

(Continued)

(51) Int. Cl.
*H04N 19/13* (2014.01)
*H04N 19/46* (2014.01)
(Continued)

(52) U.S. Cl.
CPC ............. *H04N 19/13* (2014.11); *H04N 19/46* (2014.11); *H04N 19/172* (2014.11); *H04N 19/174* (2014.11)

(58) Field of Classification Search
CPC ...... H04N 19/174; H04N 19/70; H04N 19/39; H04N 19/176; H04N 21/2221; H04N 21/234327
See application file for complete search history.

(56) References Cited

U.S. PATENT DOCUMENTS

2001/0055318 A1  12/2001  Obata
2006/0256851 A1*  11/2006  Wang ............ H04N 21/234327
                                                    375/240.01
(Continued)

FOREIGN PATENT DOCUMENTS

CN          1316838 A      10/2001
JP         2008-219180       9/2008
(Continued)

OTHER PUBLICATIONS

Boyce, J., et al., "Extensible High Layer Syntax for Scalability", No. JCTVC-E279, Mar. 10, 2011, 10 pages, XP030008785.
(Continued)

*Primary Examiner* — Obafemi Sosanya
(74) *Attorney, Agent, or Firm* — Rothwell, Figg, Ernst & Manbeck, p.c.

(57) ABSTRACT

A length indicator associated with an encoded representation of a slice is parsed. The length indicator is indicative of a length of an extension field present in a slice header of the encoded representation. A decoder can then determine to ignore, during decoding of the encoded representation, any value of the extension field in the slice header where these values are identified based on the length indicator. As a consequence, an extension field can be added to slice headers and still enable legacy decoders to correctly decode the encoded representations.

22 Claims, 7 Drawing Sheets

Related U.S. Application Data

(60) Provisional application No. 61/623,290, filed on Apr. 12, 2012.

(51) Int. Cl.
  *H04N 19/39* (2014.01)
  *H04N 19/70* (2014.01)
  *H04N 19/176* (2014.01)
  *H04N 19/174* (2014.01)
  *H04N 19/172* (2014.01)

(56) References Cited

U.S. PATENT DOCUMENTS

| | | | |
|---|---|---|---|
| 2011/0069708 A1 | 3/2011 | Song et al. | |
| 2011/0200115 A1* | 8/2011 | Hayashi | H04N 19/176 375/240.24 |
| 2012/0133736 A1 | 5/2012 | Nishi et al. | |
| 2012/0144417 A1* | 6/2012 | Khader | H04N 21/2221 725/32 |
| 2013/0070859 A1* | 3/2013 | Lu | H04N 19/30 375/240.25 |
| 2013/0101034 A1* | 4/2013 | Wahadaniah | H04N 19/70 375/240.12 |
| 2013/0114700 A1 | 5/2013 | Moriya et al. | |

FOREIGN PATENT DOCUMENTS

| | | |
|---|---|---|
| TW | 201210351 | 3/2012 |
| TW | 201215153 | 4/2012 |
| WO | 2008018690 | 2/2008 |

OTHER PUBLICATIONS

Deering, S.E., et al., "Internet Protocol, Version 6 (IPv6) Specification", rfc2460.txt, Dec. 3, 1998, 40 pages, XP015008244.

Sjoberg, R., et al., "AHG12: Slice header extension", JCT-VC Meeting; 100. MPEG Meeting; Apr. 27-May 7, 2012; Geneva; (Joint Collaborative Team on Video Coding of ISO/IEC JTC1/SC29/WG11 and ITU-T SG.16); http://wftp3.itu.int/av-arch/jctvc-site/, No. jctvc-10235, Apr. 17, 2012, 3 page, XP030111998.

Ott, J., Helsinki University of Technology et al., "RTP payload Format for ITU-T Rec. H.263 Video", rfc-4629.txt, Jan. 1, 2007, 29 pages, XP015055026.

Yao, W., et al, "Balanced Inter-Layer Prediction With Two Base Layers", 22. JVT Meeting; 79. MPEG Meeting; Jan. 13-20, 2007, Marrakech, Morocco; (Joint Video Team of ISO/IEC JTC1/SC29/WG11 and ITU-TSG.16), No. JVT-V046, Jan. 18, 2007, 10 pages, XP030006854.

First Office Action issued by the Intellectual Property Office ROC in corresponding ROC (Taiwan) Application No. 102109120 dated Mar. 26, 2016, 3 pages.

Notice of Ground for Rejection issued by the Japanese Patent Office in Application No. 2015-505680, dated Jan. 25, 2016, 3 pages.

Notice of Allowance and English translation of the Allowed Claims issued by the Japanese Patent Office in Application No. 2015-505680, dated Mar. 14, 2016, 10 pages.

Notice of Allowance and English translation of the Allowed Claims issued by the Korean Intellectual Property Office in Application No. 10-2014-7031387, dated Mar. 29, 2016, 9 pages.

Extended European Search Report issued in related Application No. 16 161 035.7 dated Jun. 27, 2016, 9 pages.

Richardson, Iain E., "Chapter 5: H.264 syntax," The H.264 Advanced Video Compression Standard, Second Edition, 2010, pp. 99-135.

Bross, Benjamin et al., "High efficiency video coding (HEVC) text specification draft 6 (JCTVC-H1003 draft 6)11, ITU-T SG16 WP3 and ISO/IEC JTC1/SC29/WG11", Feb. 13, 2012 , pp. 1-20, XP055108303, 8th Meeting: San Jose, CA, USA.

International Preliminary Report on Patentability issued in International Application No. PCT/SE2012/051477, dated Jul. 10, 2014, 22 pages.

International Search Report and Written Opinion issued in International Application No. PCT/SE2012/051477, dated Apr. 17, 2013, 13 pages.

Chinese Office Action issued in Application No. 201280073930.9 dated Mar. 13, 2017, with English Summary, 18 pages.

\* cited by examiner

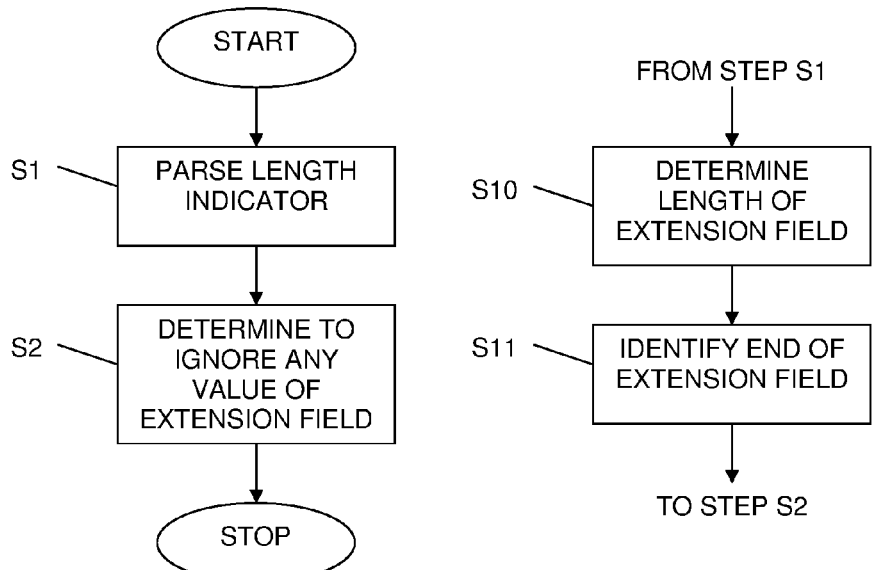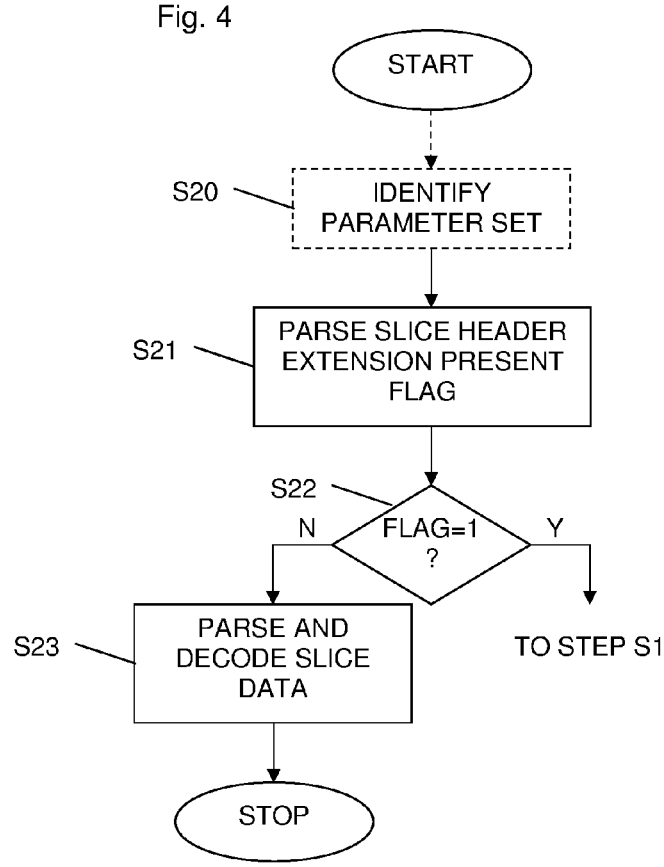

US 9,973,760 B2

EXTENSION DATA HANDLING

CROSS-REFERENCE TO RELATED APPLICATIONS

This application is a continuation of application Ser. No. 13/818,488 (published as US 2014/0211841), which was the National Stage of International Application No. PCT/SE2012/051477, filed Dec. 21, 2012, which claims priority to Provisional Application No. 61/623,290, filed Apr. 12, 2012. The above identified applications and publication are incorporated by reference.

TECHNICAL FIELD

The embodiments generally relate to encoding and decoding of slices, and in particular to handling extension data in connection with encoding and decoding of slices.

BACKGROUND

High Efficiency Video Coding (HEVC) is a new video coding standard currently being developed in Joint Collaborative Team-Video Coding (JCT-VC). JCT-VC is a collaborative project between Moving Picture Experts Group (MPEG) and International Telecommunication Union Telecommunication standardization sector (ITU-T). Currently, a Committee Draft (CD) is defined that includes a number of new tools and is considerably more efficient than H.264 Advanced Video Coding (AVC).

It is likely that extensions of HEVC will be defined in the future, such as a multi-view extension and a scalable extension. These extensions could then contain data relating to, for instance, additional views depending on a base view or additional layers depending on a base layer.

It can be assumed that backwards compatibility for some parts of an encoded sequence, e.g. the base view or the base layer, is a requirement. However, it is important that a legacy. i.e. base specification compliant, decoder is able to correctly handle the bitstream even when using such extensions.

HEVC defines some Network Abstraction Layer (NAL) unit types to be reserved for, among others, extensions. Also parameter sets, e.g. Sequence Parameter Set (SPS), Picture Parameter Set (PPS) and Adaptation Parameter Set (APS), contain extension fields at the end of their syntax tables. It is specified that a decoder conforming to the base specification of HEVC shall ignore the data in the extension field at the end of a parameter set. The syntax for the extension data is shown below in an illustrative example in the form of SPS as parameter set. The syntax would be similar if using other parameter sets than SPS. The total length of a parameter set is known by the decoder through the syntax element NumBytesInRBSP, typically provided by the system layer, so the decoder will have no problems in detecting where the extension field ends.

| seq_parameter_set_rbsp( ){ | Descriptor |
|---|---|
| ... | |
| sps_extension_flag | u(1) |
| if( sps_extension_flag ) | |
|    while( more_rbsp_data( ) ) | |
|       sps_extension_data_flag | u(1) |
| rbsp_trailing_bits( ) | |
| } | |

A NAL unit that contains an encoded slice of a picture consists of two parts: first the slice header and then the slice data. There is currently no extension field for encoded slices.

The slice header contains information about the current slice. e.g. slice type, which reference pictures to be used, etc. There is a need for adding extensions and extension fields in HEVC. However, in such a case it is important that both a legacy decoder conforming to the base specification, i.e. not using extensions, and an extension-compliant decoder could correctly handle a bitstream comprising such extensions.

The current layout of a slice header for an encoded representation of a slice makes this need hard or even impossible to implement when having both legacy and extension-compliant decoders.

SUMMARY

It is a general objective to enable usage of slice header extensions.

It is a particular objective to handle slice header extensions in connection with encoding and decoding of slices.

These and other objectives are met by embodiments disclosed herein.

An aspect of the embodiments relates to a method of decoding an encoded representation of a slice of a picture. The encoded representation comprises a slice header and slice data. The method comprises parsing a length indicator associated with the encoded representation and indicative of a length of an extension field in the slice header. The method also comprises determining to ignore, during decoding of the encoded representation, any value of the extension field identified based on the length indicator.

A related aspect of the embodiments defines a decoder for decoding an encoded representation of a slice of a picture. The encoded representation comprises a slice header and slice data. The decoder comprises a parsing unit configured to parse a length indicator associated with the encoded representation and indicative of a length of an extension field in the slice header. The decoder also comprises a processing unit configured to cause the decoder to ignore, during decoding of the encoded representation, any value of the extension field identified based on the length indicator.

Another aspect of the embodiments relates to a method of decoding an encoded representation of a slice of a picture. The encoded representation comprises a slice header and slice data. The method comprises parsing a length indicator associated with the encoded representation and indicative of a length of an extension field in the slice header. The method also comprises identifying the extension field in the slice header based on the length indicator. The encoded representation of the slice is decoded based on at least one value of the extension field identified based on the length indicator.

Another related aspect of the embodiments defines a decoder for decoding an encoded representation of a slice of a picture. The encoded representation comprises a slice header and slice data. The decoder comprises a parsing unit configured to parse a length indicator associated with the encoded representation and indicative of a length of an extension field in the slice header. The decoder also comprises an extension field identifying unit configured to identify the extension field in the slice header based on the length indicator. A decoding unit of the decoder is configured to decode the encoded representation of the slice based on at least one value of the extension field identified by the extension field identifying unit.

A further aspect of the embodiment relates to a method of encoding a slice of a picture. The method comprises generating a length indicator indicative of a length of an extension field present in a slice header of the slice. The slice is encoded into an encoded representation of the slice comprising the slice header and slice data. The length indicator is associated with the encoded representation.

A related further aspect of the embodiments defines an encoder for encoding a slice of a picture. The encoder comprises a generating unit configured to generate a length indicator indicative of a length of an extension field present in a slice header of the slice. An encoding unit is configured to encode the slice into an encoded representation of the slice comprising the slice header and slice data. The encoder also comprises an associating unit configured to associate the length indicator with the encoded representation.

An additional aspect of the embodiments relates to a receiver comprising a decoder for decoding an encoded representation of a slice of a picture. The encoded representation comprises a slice header and slice data. The decoder comprises a parsing unit configured to parse a length indicator associated with the encoded representation and indicative of a length of an extension field in the slice header. The decoder also comprises a processing unit configured to cause the decoder to ignore, during, decoding of the encoded representation, any value of the extension field identified based on the length indicator.

Another additional aspect of the embodiments relates to a receiver comprising a decoder for decoding an encoded representation of a slice of a picture. The encoded representation comprises a slice header and slice data. The decoder comprises a parsing unit configured to parse a length indicator associated with the encoded representation and indicative of a length of an extension field in the slice header. The decoder also comprises an extension field identifying unit configured to identify the extension field in the slice header based on the length indicator. A decoding unit of the decoder is configured to decode the encoded representation of the slice based on at least one value of the extension field identified by the extension field identifying unit.

Yet another additional aspect of the embodiments relates to a transmitter comprising an encoder for encoding a slice of a picture. The encoder comprises a generating unit configured to generate a length indicator indicative of a length of an extension field present in a slice header of the slice. The encoder also comprises an encoding unit configured to encode the slice into an encoded representation of the slice comprising the slice header and slice data. An associating unit of the encoder is configured to associate the length indicator with the encoded representation.

A further aspect of the embodiment relates to a computer program for decoding an encoded representation of a slice of a picture. The encoded representation comprises a slice header and slice data. The computer program comprises code means which when run by a processor causes the processor to parse a length indicator associated with the encoded representation and indicative of a length of an extension field in the slice header. The processor is also caused to determine to ignore, during decoding of the encoded representation, any value of said extension field identified based on the length indicator.

A further related aspect of the embodiment defines a computer program for decoding an encoded representation of a slice of a picture. The encoded representation comprises a slice header and slice data. The computer program comprises code means which when run by a processor causes the processor to parse a length indicator associated with the encoded representation and indicative of a length of an extension field in the slice header. The processor is also caused to identify, based on the length indicator, the extension field in said slice header and decode the encoded representation of the slice based on at least one value of the extension field identified based on the length indicator.

Yet a further related aspect of the embodiments defines a computer program for encoding a slice of a picture. The computer program comprises code means which when run by a processor causes the processor to generate a length indicator indicative of a length of an extension field present in a slice header of the slice. The processor is also caused to encode the slice into an encoded representation of the slice comprising the slice header and slice data. The processor is further caused to associate the length indicator with the encoded representation.

Another additional aspect of the embodiments relates to a computer program product comprising computer readable medium and a computer program stored on the computer readable medium.

The present embodiments enable introduction of extension fields into slice headers of encoded representations of slices and still producing such encoded representations that could be correctly handled even by legacy decoders that are not compatible with extension fields.

BRIEF DESCRIPTION OF THE DRAWINGS

The invention, together with further objects and advantages thereof, may best be understood by making reference to the following description taken together with the accompanying drawings, in which:

FIG. 4 is a flow diagram of a method of decoding an encoded representation of a slice according to an embodiment;

FIG. 5 is a flow diagram illustrating additional, optional steps of the method in FIG. 4 according to an embodiment;

FIG. 6 is a flow diagram illustrating additional, optional steps of the method in FIG. 4 according to another embodiment;

DETAILED DESCRIPTION

Throughout the drawings, the same reference numbers are used for similar or corresponding elements.

The present embodiments are directed towards extension data handling in connection with encoding and decoding of slices of pictures. Hence, the embodiments enable introduction and usage of so called extension fields, also denoted extension syntax elements, in slice headers for the slices. Such extension fields can, according to the embodiments, be added to the slice headers and still present an encoded representation that could be correctly handled both by extension-compliant decoders and those decoders that cannot handle extension data, i.e. are conformant to a profile that does not use extension fields. These decoders are generally denoted legacy decoders or base specification compliant decoders.

The presence of both extension-compliant and legacy decoders imposes problems in connection with usage of extension fields in the slice headers. Hence, a legacy decoder needs to be able to correctly decode and interpret the data of an encoded representation of a slice even if the encoded representation carries extension data in its slice header.

It is not possible to add the same kind of extension field as in the parameter sets discussed in the background section, where all additional data at the end of the syntax structure is ignored by the decoder. The reason being that the decoder has no way to identify where the slice header ends and the slice data begins. Thus, the length of the individual data structures, i.e. slice header and slice data, are not known, only the total length by the syntax element NumBytesInRBSP. Thus, the slice layer raw byte sequence payload (RBSP) syntax generally looks like:

```
slice_layer_rbsp( ) {
    slice_header( )
    slice_data( )
    rbsp_slice_trailing_bits( )
}
```

Thus, it is not possible to add a simple extension field where all additional data at the end of the slice header is ignored by a legacy decoder since there would be no way for the legacy decoder to identify where the slice header ends and the slice data begins.

It is proposed to associate a length indicator with the encoded representation of the slice and where this length indicator is indicative of a length of an extension field present in the slice header of the slice. Hence, the length indicator enables a decoder to identify the portion of the encoded representation of the slice and the slice header that constitutes the extension field. Thus, the legacy decoder could therefore determine which portion of the encoded representation to ignore during decoding since it contains extension data that the legacy decoder cannot handle.

However, whereas a legacy decoder should ignore the extension data during decoding an extension-compliant decoder is able to decode and use this extension data during the decoding.

Figure 1:
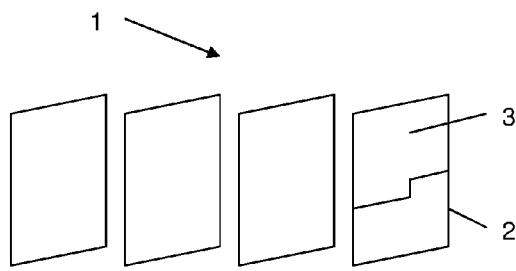
FIG. 1 is a schematic illustration of a video stream of pictures comprising one or more slices.

FIG. 1 is a schematic illustration of a video sequence or stream 1 of pictures 2. As is well known in the art each picture 2 can comprise one or more so called slices 3. Thus, each picture 2 of the video stream 1 is divided into one or more slices 3, where each slice 3 is an independently decodable piece of the picture 2. In other words, if one slice 3 is lost, the other slices 3 of that picture 2 are still decodable.

Figure 2:
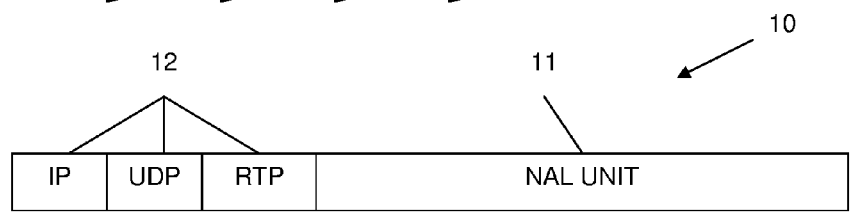
FIG. 2 is an illustration of a data packet comprising a NAL unit.

The encoding of a slice 3 generates an encoded representation of the slice 3 comprising a slice header and slice data. The encoded presentation is output from the encoding process as a so called Network Adaptation Layer (NAL) unit 11 as shown in FIG. 2. The first part of the NAL unit 11 is a header that contains an indication of the type of data in the NAL unit. The remaining part of the NAL unit 11 contains payload data in the form of the slice header and slice data.

The NAL unit 11 may then be added with headers 12 to form a data packet 10 that can be transmitted as a part of a bitstream from the encoder to the decoder. For instance, Real-time Transport Protocol (RTP), User Datagram Protocol (UDP) and Internet Protocol (IP) headers 12 could be added to the NAL unit 11. This form of packetization of NAL units 11 merely constitutes an example in connection with video transport. Other approaches of handling NAL units 11, such as file format, MPEG-2 transport streams, MPEG-2 program streams, etc. are possible.

The embodiments as disclosed herein are in particular applicable and directed towards decoding and encoding of slices 3 of pictures 2 in a video stream or sequence 1, where the video stream or sequence 1 comprises multiple pictures 2 as shown in FIG. 1. The embodiments will therefore mainly be discussed in connection with such video decoding and coding.

However, the embodiments could also be applied to decoding and encoding of slices in a single picture, e.g. in connection with such decoding and encoding of still pictures or images. For instance, extension data could be used in connection with spatially scalable still pictures.

FIG. 4 is a flow diagram illustrating a method of decoding an encoded representation of a slice of a picture, optionally but preferably in a video stream. The method of FIG. 4 is preferably a method performed by a decoder during decoding of an encoded representation of a slice of a picture or of a decoding method for an encoded representation of a slice of a picture.

Figure 3A:
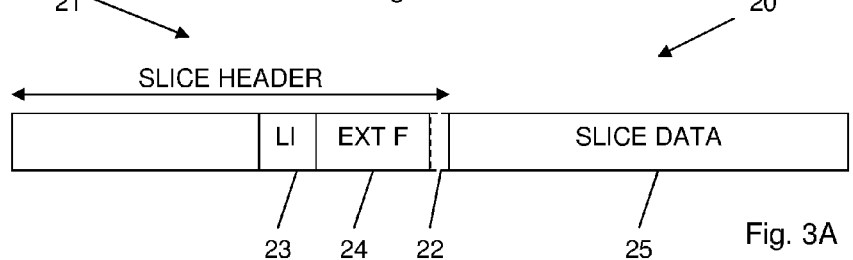
FIGS. 3A-3C are illustrations of encoded representations of a slice.
Figure 3B:
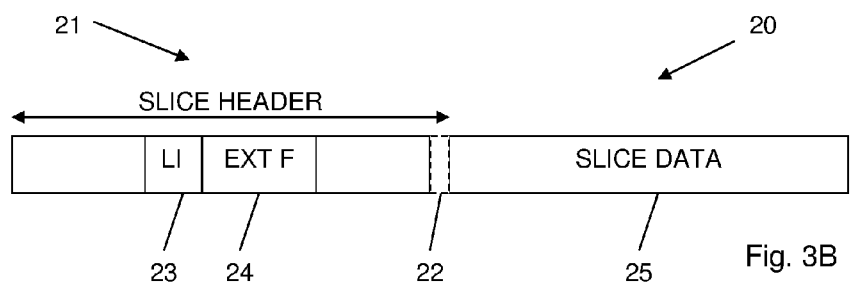
Figure 3C:
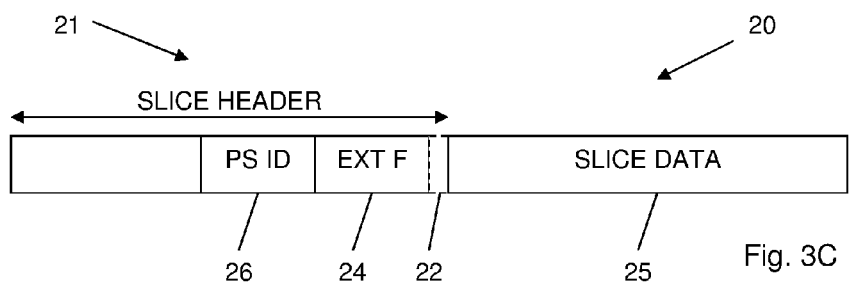

FIGS. 3A-3C illustrate non-limiting examples of such an encoded representation 20 of a slice. The encoded representation 20 comprises a slice header 21 and slice data 25.

The method of FIG. 4 comprises a step S1 in which a length indicator (LI) 23 associated with or to the encoded representation 20 is parsed. This length indicator 23 is indicative of a length of an extension field (EXT F) 24 in the slice header 21. In a following step S2 it is determined to ignore, during decoding of the encoded representation 20, any value of the extension field 24 identified based on the length indicator 23.

This means that the length indicator 23 associated with the encoded representation 20 can be used to identify the portion of the encoded representation 20 occupied by the extension field 24. Hence, a decoder can thereby use the length indicator 23 to determine or decide to ignore and thereby not use value(s) or data of the extension field 24, where this extension field 24 is identified in the slice header 21 based on the length indicator 23. Thus, the decoder thereby uses the length indicator 23 to skip an amount or a portion of data in the slice header 21, where the amount or portion of data skipped is indicated by the length indicator 23.

In a particular embodiment, the method of decoding an encoded representation 20 of a slice of a picture, such as in a video stream, comprises parsing a length indicator 23 associated with the encoded representation 20 and indicative of a length of an extension field 24 in the slice header 21. The method further comprises in this particular embodiment ignoring, during decoding of the encoded representation 20, any value of the extension field 24 identified based on the length indicator 23.

The length indicator 23 associated with the encoded representation 20 enables also legacy decoders to handle and decode the encoded representation 20. These legacy decoders simply determine to ignore the value(s) or data obtained from the portion of the slice header 21 that is occupied by the extension field 24 and where this portion of the slice header 21 is identified based on the parsed length indicator 23.

Associating as used herein implies that it is possible to identify and retrieve the relevant length indicator 23 based on the encoded representation 20. As is further disclosed herein this could, for instance, be achieved by including the length indicator 23 in the encoded representation 20, typically in the slice header 21, see FIGS. 3A and 3B, or by including data, such as an identifier 26, in the encoded representation 20 and where this data or identifier 26 can be used to identify the relevant length indicator 23, see FIG. 3C. In this latter case, the length indicator 23 could be provided in another data structure than the encoded representation 20. The data or identifier 26 therefore points to and enables identification of this other data structure.

FIG. 5 is a flow diagram illustrating additional steps of the method according to a particular embodiment. These additional, but optional, steps start with step S10 that continues from step S1 in FIG. 4. In step S10 a length of the extension field is determined based on the length indicator 23 parsed in step S1. In a next step S11 the end of the extension field 24 in the slice header 21 is identified based on the length determined in step S10. In the following step S2 the decoder can therefore decide or determine to ignore the value or values of the extension field 24 up to the end of the extension field 24 as identified in step S11.

Optionally the start of the extension field 24 in the slice header 21 is also identified. In an embodiment, the start could be in a fixed or predefined position in the slice header 21, such as a defined bit or byte position in the slice header 21. Alternatively, the start of the extension field 24 could be determined based on the length indicator 23, such as directly following the length indicator 23 in the slice header 21, see FIGS. 3A and 3B. Generally, a position of a syntax element in the slice header 21 is given by a length of preceding syntax elements. This is in particular true if variable length coding is applied to one or more preceding syntax elements in the slice header 21. In such a case, the decoder typically starts parsing and decoding the slice header 21 from the first bit position and going through the various syntax elements until it reaches to the start of the extension field 24.

In an embodiment a length indicator 23 indicating the length of additional slice data. i.e. the extension field 24, is introduced. The length indicator 23 is exemplified by a syntax element in e.g. the slice header 21 or another data structure, which is associated with the slice header 21, or the length may derived by a bit-pattern. Accordingly, an encoder is configured to use the defined syntax element 23 to signal the length of the additional data. A decoder is configured to determine the length of the additional data. The additional data will be ignored by decoders conformant to some profiles while decoders conformant to other profiles will parse it and use the values of syntax element in the additional data. Decoders conformant to profiles that ignores it will use the length information to determine the end of the slice header 21 such that the NAL unit can be decoded.

The embodiments therefore enable extension of a slice header 21 in a simple and bitrate efficient way.

In a particular embodiment applicable to the method of FIG. 4 and to the embodiment shown in FIG. 5, the length indicator 23 is a codeword or syntax element present in the slice header 21 as shown in FIGS. 3A and 3B. This means that step S1 then comprises parsing the length indicator 23 present in the slice header 21.

In a particular embodiment, the length indicator 23 is present in the slice header 21 directly preceding the extension field 24. Hence the extension field 24 directly follows the length indicator 23 in the slice header 21 in this particular embodiment. In such a case, step S2 of FIG. 4 could comprise, in an embodiment, determining to ignore, during decoding of the encoded representation 20, any value or data of the extension field 24 directly following the length indicator 23 in the slice header 21 up to an end of the extension field 24. This end of the extension field 24 is identified based on the length indicator 23, such as disclosed above in connection with step S11 of FIG. 5.

In another particular embodiment, the length indicator 23 is not necessarily present in the slice header 21 but otherwise associated with the encoded representation 20. For instance, a slice header 21 typically comprises an identifier 26 of a parameter set associated with the encoded representation 20 and comprising data applicable to the present slice. FIG. 3C illustrates this case with a parameter set (PS) identifier (ID) 26 in the slice header 21.

For instance, an adaptation parameter set (APS) comprises control information valid for more than one slice. The control information may differ between the slices. A picture parameter set (PPS) comprises control information valid for several pictures, and which may be the same for multiple pictures of the same video sequence or stream. A sequence parameter set (SPS) comprises control information valid for an entire video sequence or stream. HEVC also uses so called a Video Parameter Set (VPS). In such a case, the length indicator 23 could be present in any of these parameter sets, such as in the APS, VPS, PPS or SPS applicable to the present slice. In such a case, the slice header 21 preferably comprises a parameter set identifier 26 enabling identification of the relevant parameter set that carries the length indicator 23. The decoder could then use this parameter set identifier 26 in order to identify the correct parameter set and then parse the length indicator 23 from the identified parameter set. The parameter set identifier 26 could directly identify the parameter set, such as an APS identifier or a PPS identifier. In an alternative approach the parameter set identifier 26 identifies a parameter set that in turn comprises another parameter set identifier to another parameter set that carries the length indicator 23. For instance, the slice header 21 could comprise a PPS identifier to a PPS that is applicable to the present slice. This PPS may in turn comprise an SPS identifier to an SPS that is applicable to the PPS and the present slice and where this SPS comprises the length indicator 23.

If the size or length of the extension field 24 in terms of the number of bytes or bits is likely to be similar for several slices in the video stream it could be preferred to add the length indicator 23 in a parameter set instead of signaling it directly in each encoded representation 20. In such a case, the total size or length of the encoded representation 20 could be somewhat reduced by not having to include the bits of the length indicator 23 in the slice header 21. In this approach multiple slices will therefore share a same length indicator 23 by referring to the same parameter set that comprises the length indicator 23.

However, there is generally a much larger flexibility in including the length indictor 23 directly in the slice headers 21 in each encoded representation 20. As a consequence, the size or length of the extension field 24 may therefore be allowed to differ between different slices. In addition, no referral to a parameter set is required in order to parse the length indicator 23.

The parsing of the length indicator as shown in step S1 in FIG. 4 does not necessarily have to be performed for each encoded representation 20. In particular, if the length indicator 23 is present in a parameter set identified based on a parameter set identifier 26 present in the slice header the relevant parameter set could be identified for the first encoded representation 20 of the video sequence comprising the parameter set identifier 26. The data in the identified parameter set is then parsed and the decoded values and data present therein, including the length indicator 23, are then typically stored in a memory of the decoder. Then the decoder keeps track of the activated parameter set, i.e. a parameter set that has already been parsed and decoded. This means that when a subsequent encoded representation 20 of the video sequence comprises a parameter set identifier 26 identifying this parameter set the data, including the length indicator 23, could be retrieved from the stored values in the memory.

Hence, parsing the length indicator 23 in step S1 does not necessarily have to be performed for each encoded representation 20, in particular if the length indicator 23 is present in a parameter set. However, this step S1 is preferably performed at least once for an encoded representation 20 having a parameter set identifier 26 pointing to the relevant parameter set in its slice header 21. Step S1 could then, for any following encoded representation 20 of the video sequence comprising a parameter set identifier 26 for this relevant parameter set, comprise reading or retrieving, from a memory, the length indicator associated with the encoded representation and indicative of the length of the extension field in the slice header.

The length indicator 23, see FIGS. 3A and 3B, or the parameter set identifier 26, see FIG. 3C, does not necessarily have to directly precede the extension field 24 in the slice header 21 as is shown in FIGS. 3A-3C. It is generally preferred to have the extension field 24 directly following the length indicator 23 or the parameter set identifier 26. However, this is not necessary. In alternative embodiments, other slice header data, i.e. at least one syntax element or codeword, could be present in between the position of the length indicator 23 or the parameter set identifier 26 and the extension field 24 in the slice header 21.

FIG. 6 is a flow diagram of additional, optional steps of the method of FIG. 4. In step S21 a slice header extension present flag associated with the encoded representation is parsed. This slice header extension present flag could be present in the slice header 21 or otherwise associated with the encoded representation 20. For instance, the slice header extension present flag could be present in a parameter set associated with the slice, such as in a PPS. The method then preferably comprises the optional step S20 in which a parameter set, such as a PPS, associated with the encoded representation 20 is identified based on a parameter set identifier, such as a PPS identifier, obtainable based on the slice header 21. The parameter set identifier could be directly retrieved from the slice header 21 or could be retrieved from another parameter set, which is identified by another parameter set identifier directly retrieved from the slice header 21. Step S21 then preferably comprises parsing the slice header extension flag present in the parameter set, such as in the PPS.

Parsing the slice header extension present flag in step S21 does not necessarily have to be performed for every encoded representation 20 of a video sequence, in particular if the slice header extension present flag is present in a parameter set as identified in step S20. In such a case, the relevant parameter set could be identified, parsed and decoded for the first encoded representation 20 having a parameter set identifier 26 pointing to this parameter set. The decoded data of the parameter set, including the slice header extension present flag, could then be stored in a memory of the decoder. In such a case, the value of the slice header extension present flag can simply be read or retrieved from a memory for any subsequent encoded representation 20 having a parameter set identifier 26 pointing to the previously parsed and decoded parameter set.

The slice header extension present flag indicates whether there is any extension field 24 present or not in the slice header 21. Thus, if the slice header extension present flag has a first predefined value, such as $1_{bin}$, an extension field 24 is present in the slice header 21 and the encoded representation 20 is associated with a length indicator 23. However, if the slice header extension present flag has a second predefined value, such as $0_{bin}$, no extension field 24 is present in the slice header 21 and therefore no length indicator 23 is associated with the encoded representation 20.

In a next step S22 the parsed slice header extension present flag is analyzed and it is determined whether it has the first predefined value or the second predefined value. For instance, if the slice header extension present flag is set, i.e. equal to $1_{bin}$, the method continues to step S1 of FIG. 4 where the length indicator 23 is parsed. Thus, in this case an extension field 24 is present and a legacy decoder needs to identify the portion of the slice header 21 that correspond to the extension field 24.

If the slice header extension present flag is not set, i.e. equal to $0_{bin}$, the method instead continues to step S23 where the decoder can simply start parsing and decoding the slice data 25 that follows the slice header 21. Thus, in this case there is no extension field present in the slice header 21 that needs to be identified by a legacy decoder.

In a particular embodiment the picture parameter set RBSP syntax could look like:

| pic_parameter_set_rbsp( ){ | Descriptor |
|---|---|
| ... | |
| slice_header_extension_present_flag | u(1) |
| ... | |
| } | | slice_header_extension_present_flag equal to 0 specifies that no slice header extension syntax elements are present in the slice header for coded pictures referring to the picture parameter set.

A general slice header syntax could then in this particular embodiment look like:

```
slice_header( ) {                                          Descriptor
   ...
   if( slice_header_extension_present_flag ) {
      slice_header_extension_length                        ue(v)
      for( i=0; i<slice_header_extension_length;++)
         slice_header_extension_data_byte[ i ]             u(8)
   }
   byte_alignment( )
}
``` slice_header_extension_length specifies the length of the slice header extension data in bytes, not including the bits used for signaling slice_header_extension_length itself. The value of slice_header_extension_length could be in the range of 0 to 256, inclusive. The size of slice_header_extension_length does not necessarily have to be in Universal Variable Length Code (UVLC) but could of fixed length, i.e. u(q) for some positive integer q.

slice_header_extension_data_byte may have any value. Legacy decoders should ignore the value of slice_header_extension_data_byte. slice_header_extension_data_byte could alternative use bits, i.e. u(1), instead of bytes, i.e. u(8).

The slice header extension present flag implies that the decoder can determine, by simply reading this single flag, preferably in the form of an one-bit flag, whether an encoded representation 20 comprises any extension field 24 that needs to be processed, i.e. parsed and used by an extension-compliant decoder or ignored by a legacy decoder. Hence, usage of the slice header extension present flag simplifies decoding of the encoded representations 20 in situations where some encoded representations 20 could comprise extension fields 24 whereas others do not. In such a case, the decoder does not need to parse and use any length indicator 23 but can simply investigate the value of the slice header extension present flag.

The slice header extension present flag is advantageously inserted in a parameter set since it is likely that multiple slices in the video stream will either have no extension fields 24 or have extension fields 24. It is then more bit-efficient to signal the slice header extension present flag in the parameter set as compared to including such a slice header extension present flag in each slice header 21.

In a particular embodiment, the slice data 25 starts directly following the end of the extension field 24 in the encoded representation 20. Hence, in this approach the bit position following the end of the extension field 24 as identified based on the length indicator 23 constitutes the first bit of the slice data 25.

In another particular embodiment, byte alignment data 22 could be inserted between the extension field 24 and the slice data 25 as indicated in FIG. 3A and further mentioned in the general slice header syntax above. Such byte alignment data may be employed at the end of the slice header 21 to get the start of the slice data 25 byte aligned. In such a case, the length indicator 23 can be used to identify the portion of the slice header 21 that is occupied by the extension field 24 and could, for instance, indicate the length of the extension field 24 and thereby signal the end of the extension field 24. Thereafter follows the byte alignment data 22 and then the slice data 25. This means that even if byte alignment data 22 is used the decoder will be able to identify the start of the slice data 25 and the portion of the slice header 21 that constitutes the extension field 24 based on the length indicator 23.

The byte alignment data 22 preferably has a well-defined syntax, for instance:

```
byte_alignment( ) {                                Descriptor
   bit_equal_to_one /* equal to 1 */               f(1)
   while( !byte_aligned( ) )
      bit_equal_to_zero /* equal to 0 */           f(1)
}
```

In this example the byte alignment data always comprises at least one bit. If the end of the extension field 24 should be byte aligned an 8-bit codeword, 1000 0000$_{bin}$, is used.

FIG. 3B illustrates an embodiment of the encoded representation 20 of a slice showing that the length indicator 23 and the extension field 24 not necessarily has form the last syntax elements (excluding the optional byte alignment data 22) of the slice header 21. In clear contrast, the length indicator 23 and the extension field 24. FIG. 3B, or indeed the parameter set identifier 26 and the extension field, FIG. 3C, could be present anywhere in the slice header 21.

Figure 7:
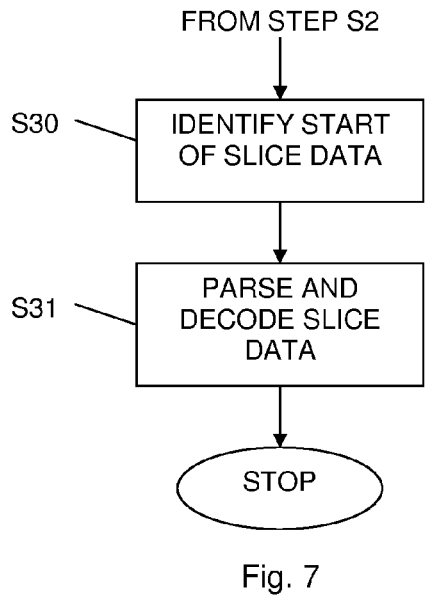
FIG. 7 is a flow diagram illustrating additional, optional steps of the method in FIG. 4 according to a further embodiment.

FIG. 7 is a flow diagram illustrating additional, optional steps of the method in FIG. 4. The method continues from step S2 in FIG. 4. In a next step S30 a start of the slice data 25 in the encoded representation 20 is identified based on an end of the extension field 24 as identified based on the length indicator 23, such as disclosed in step S11 of FIG. 5. As mentioned above, the start of the slice data 25 could directly follow the end of the extension field 24. In an alternative approach, byte alignment data 22 is interposed between the extension field 24 and the start of the slice data 25. In such a case, the length indicator 23 can be used to identify the end of the extension field 24. The following bit or bits in the encoded representation 20 constitute(s) the byte alignment data 22. This portion of the encoded representation 20 is interpreted by the decoder as byte alignment data 22 since it has a well-defined syntax, such as exemplified above. Once the end of the byte alignment data 22 is reached the start of the slice data 25 is found. It is also possible, which is further described below, that other slice header data could follow the extension field 24.

When the decoder has identified the start of the slice data 25 it can parse and decode the slice data 25 in step S31 from the identified start of the slice data 25.

A legacy decoder preferably parses and decodes the slice data in step S31 by ignoring, i.e. not using, any value or data of the extension field 24 in the slice header 21 during the parsing and decoding process of step S31. Hence, the legacy decoder cannot use the extension field 24 in the slice header 21 since this extension field 24 is, according the base profile or base specification to which the legacy decoder conforms, is unspecified.

However, an extension-compliant decoder should make use of the data in the extension field 24 in the slice header during the parsing and decoding process, optionally including post-decoding processing of the slice data 25.

The present embodiments may also be applied to the case where the slice header 21 comprises multiple, i.e. at least two, extension fields 24. In such a case, each extension field 24 preferably comprises a respective length indicator 23. The extension fields 24 could all be arranged in connection with the end of the slice header 21, possibly followed by optional byte alignment data 22. However, it is also possible to have a distributed organization of the extension fields 24 in the slice header 21. In this latter case, the extension fields 24 could be provided anywhere in the slice header 21. For instance, a first extension field 24 could be present in the first or middle part of the slice header 21, whereas a second extension field 24 could be present in the end part of the slice header 21.

If multiple extension fields 24 may be present in the slice header 21 the respective length indicators 23 could be present in one or more parameter sets, in the slice header 21 or be distributed among the slice header 21 and one or more parameter sets. For instance, a first length indicator 23 of a first extension field 24 could be present in a parameter set, such a PPS. A second length indicator 23 of a second extension field 24 could then be present in the slice header 21. The presence of any of the extension fields 24 and length indicators 23 could be signaled by a flag, for instance in a parameter set. For example, a PPS could comprise the first length indicator 23 and a flag indicating the presence or absence of the second extension field 24. The second length indicator 23 and the second extension field 24 are then, if the flag has been set to a defined value, present in the slice header 21.

In the case of multiple extension fields 24, step S1 of FIG. 4 is preferably performed once for each extension field 24 and length indicator 23. Thus, each length indicator 23 associated with the encoded representation 20 is identified and parsed in order to enable identification of the respective extension field 24 in the slice header 21 so that a legacy decoder can determine to ignore the respective value or values of the extension fields in step S2.

Figure 8:
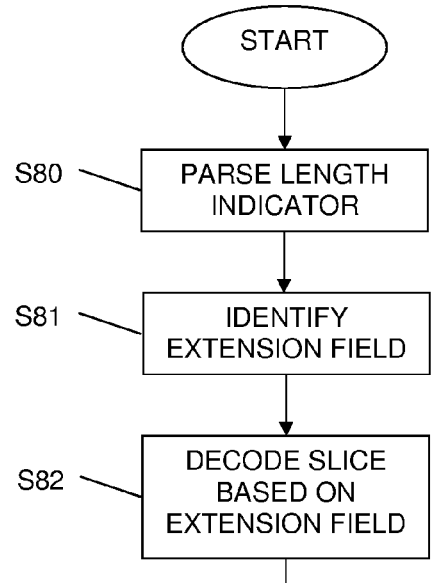
FIG. 8 is a flow diagram of a method of decoding an encoded representation of a slice according to another embodiment.

FIG. 8 is a flow diagram illustrating another embodiment of a method of decoding an encoded representation of a slice of a picture. The encoded representation comprises a slice header and slice data. This embodiment is particularly performed by an extension-compliant decoder, i.e. a decoder that understands and can make use of the value or values in an extension field present in the slice header.

The method starts in step S80 where a length indicator associated with the encoded representation and indicative of a length of an extension field in the slice header is parsed. This step S1 basically corresponds to step S1 in FIG. 4 and is not further discussed herein.

A next step S81 identifies the extension field in the slice header based on the length indicator parsed in step S80. Thus, the length indicator is used in step S81 in order to identify the portion of the slice header that is occupied by the extension field. This step S81 can be performed as previously disclosed herein, for instance in connection with FIGS. 4 and 5.

If the slice header comprises multiple extension fields steps S80 and S81 are preferably performed once for each extension field and associated length indicator.

In the following step S82 the encoded representation of the slice is decoded based on at least one value, preferably all values, of the extension field in the slice header as identified in step S81 based on the length indicator parsed in step S80.

Thus, in this embodiment the decoder is extension-compliant and will therefore use the value or values of the extension field or at least a portion of the values when decoding the encoded representation of the slice and in particular during decoding of the slice data in the encoded representation.

The extension field could, for instance, include one or more flags and/or other syntax elements that dictate and provide instructions to the decoder of how to perform the decoding of the slice data. Hence, the extension-compliant decoder makes use of the data in the extension field in the slice header during the parsing and decoding process, and optionally including post-decoding processing of the slice data.

Decoding of the encoded representation of the slice based on at least one value of the extension field in step S82 relates to any processing of the encoded representation of the slice as performed by a decoder. Hence, decoding as defined in step S82 is not merely limited to the actual generation of pixel data of the slice from the slice data present in the encoded representation of the slice. This means that the at least one value of the extension field could, for instance, be used by the decoder for handling a reference picture buffer comprising previously decoded pictures of a video sequence that are temporarily stored for being output, e.g. for display, and/or temporarily stored for being used as decoding reference for following, according to a decoding order, pictures of the video sequence. The at least one value of the extension field could alternatively, for instance, be used by the decoder to remove or drop specific NAL units of the bitstream. For example, the extension field could indicate that a specific NAL unit can be dropped, and therefore not entered in or removed from the reference picture buffer, if only a higher-layer encoded representation is being decoded.

Thus, the decoding as defined in step S82 encompasses various operations of the decoder taking place in connection with, i.e. preceding, simultaneously or following, the actual generation of pixel values for a present slice.

A particular embodiment relates to a method performed during decoding an encoded representation of a slice of a picture in a video sequence comprising multiple pictures. Each picture of the video sequence belongs to a layer of multiple layers. The encoded representation comprises a slice header and slice data. The method comprises parsing a length indicator associated with the encoded representation and indicative of a length of an extension field in the slice header. The extension field in the slice header is identified based on the length indicator. The method also comprises processing a layered structure of said multiple pictures based on at least one value of the extension field in the slice header.

In this particular embodiment the pictures of the video sequence are organized in a layered structure with the multiple layers. These layers could then correspond to different views in the case of multi-view view, different temporal layers in the case of scalable video, etc. The processing of the layered structure, including for instance removing one or more pictures or NAL units carrying pictures, in the decoder is then preferably performed at least partly based on at least one value of the extension field.

Herein follows a number of example embodiments disclosing variants and alternatives of implementing the present embodiments.

In a first example embodiment there is a codeword (syntax element). i.e. the length indicator 23, in the slice header 21 that represents the length of an extension field 24 in the slice header 21. The encoder is configured to insert the length indicator 23 as a syntax element according to this first example embodiment. A decoder shall parse the value of the codeword, i.e. length indicator 23, in order to locate the start of the slice data 25 and thereby skip the extension field 24.

The name of the codeword that represents the length of the extension field 24 could for example be slice_header_extension_length.

According to this example embodiment, the decoder is configured to perform the following steps:
(1) The slice_header_extension_length syntax element 23 is parsed;

(2) The decoder parses and ignores the values of slice_header_extension_length number of bits following directly after the slice_header_extension_length syntax element 23; and (3) The decoder parses and decodes the slice data 25 starting with the first bit that follows after the parsing of slice_header_extension_length number of bits (at the bit position where the parsing in step 2 ended).

In this embodiment the decoder therefore parses and reads the data or values of the extension field 24 in the slice header 21 during the header decoding. However, even if the values are parsed and possibly decoded the decoder ignores the values, i.e. does not use them further during the decoding and processing of the slice data 25.

Alternatively a decoder may be configured to perform the following steps:

(1) The slice_header_extension_length syntax element 23 is parsed.

(2) The decoder jumps forward slice_header_extension_length number of bits in the bitstream 20.

(3) The decoder parses and decodes the slice data 25 starting with the first bit that follows after the jump of slice_header_extension_length number of bits (at the bit position where the jump in step 2 ended).

In this embodiment the decoder does not parse or read the data or values of the extension field 24 but rather jumps over the portion of the slice header 21 that is occupied by the extension field 24 as defined based on the length indicator 23.

In a second example embodiment, the presence of the syntax element 23 described in the first example embodiment is conditioned on another syntax element, for example called slice_header_extension_present_flag. If slice_header_extension_present_flag is 0 the slice_header_extension_length syntax element 23 and the extension data 24 is not present. If slice_header_extension_present_flag is 1 the slice_header_extension_length syntax element 23 and the extension data 24 is present. The slice_header_extension_present_flag is preferably signaled in the SPS but may alternatively be signaled in the PPS, VPS, APS or in the slice header 21.

Accordingly, the encoder is configured to condition the presence of the length indicator 23 of the first example embodiment by using a flag.

According to this embodiment, the decoder is configured to perform the following ordered steps:

(1) The slice_header_extension_present_flag from the active SPS is used.

(2) If slice_header_extension_present flag is equal to 1:
 (a) The slice_header_extension_length syntax element 23 is parsed.
 (b) The decoder parses and ignores the values of slice_header_extension_length number of bits following directly after the slice_header_extension_length syntax element 23.
 (c) The decoder parses and decodes the slice data 25 starting with the first bit that follows after the parsing of slice_header_extension_length number of bits (at the bit position where the parsing in step b ended).

(3) Otherwise, (slice_header_extension_present_flag is equal to 0), the decoder parses and decodes the slice data 25 without parsing a slice_header_extension_length syntax element 23 and without parsing any extension data 24. Neither the slice_header_extension_length syntax element 23 nor extension data 24 will be present in the slice.

Alternatively, a decoder may be configured to perform the following steps:

(1) The slice_header_extension_present_flag from the active SPS is used.

(2) If slice_header_extension_present_lag is equal to 1:
 (a) The slice_header_extension_length syntax element 23 is parsed.
 (b) The decoder jumps forward slice_header_extension_length number of bits in the bitstream 20.
 (c) The decoder parses and decodes the slice data starting with the first bit that follows after the jump of slice_header_extension_length number of bits (at the bit position where the jump in step b ended).

(3) Otherwise, (slice_header_extension_present_flag is equal to 0), decoder parses and decodes the slice data 25 without parsing a slice_header_extension_length syntax element 23 and without performing a jump in the bitstream 20. Neither the slice_header_extension_length syntax element 23 nor extension data 24 will be present in the slice.

The syntax table could for example look like this:

| slice_header( ) { | Descriptor |
|---|---|
| ... | |
|   if( slice_header_extension_present_flag ) { | |
|     slice_header_extension_length | ue(v) |
|     for( i = 0; i < slice_header_extension_length; i++) | |
|       slice_header_extension_data_flag | u(1) |
|   } | |
| } | |

In a third example embodiment, the length of the entire slice header 21 is given by a syntax element 23 and the extension field 24 is added at the end of the slice header 21 similar to the extension fields of the parameter sets.

Accordingly, the encoder is configured to indicate the length of the entire slice header 21 by a syntax element, i.e. the length indicator 23, and the extension field 24 is added at the end of the slice header 21 similar to the extension fields of the parameter sets.

According to this embodiment, the decoder is configured to perform the following steps:

(1) The slice_header_extension_present_flag from the active SPS is used, if present. Otherwise steps 1, 2 and 3 are omitted and only steps a, b and c are performed.

(2) If slice_header_extension_present_flag is equal to 1:
 (a) The slice_header_extension_length is calculated as the length of the slice header 21 minus the current bit position.
 (b) The decoder parses and ignores the values of slice_header_extension_length number of bits following directly after the slice_header_extension_length syntax element, i.e. the syntax element indicating the length of the entire slice header 21.
 (c) The decoder parses and decodes the slice data 25 starting with the first bit that follows after the parsing of slice_header_extension_length number of bits (at the bit position where the parsing in step b ended).

(3) Otherwise, (slice_header_extension_present_flag is equal to 0), decoder parses and decodes the slice data 25 without parsing a slice_header_extension_length syntax element 23 and without parsing any extension data 24. Neither the slice_header_extension_length syntax element 23 nor extension data 24 will be present in the slice.

Thus, in this embodiment step S10 of FIG. 5 relating to the determination of the length of the extension field 24 is preferably performed by calculating the length of the extension field 24 by subtracting a bit or byte position of an end of the length indicator 23 in the slice header 21 from a value represented by the length indicator 23. This value represented by the length indicator 23 is then preferably the length of the slice header 21.

In a variant of step 3 of the first and second example embodiment and step c of the third example embodiment byte alignment data 22 can be interposed between the extension field 24 and the slice data 25. In such a case, the decoder parses the byte alignment data 22 starting with the first bit that follows after the parsing of slice_header_extension_length number of bits (first and third example embodiment) or the first bit that follows after the jump of slice_header_extension_length number of bits (second example embodiment). The decoder then, once the end of the byte alignment data 22 has been reached, parses and decodes the slice data 25.

In a fourth example embodiment a specific bit-pattern ("startcode") is used to indicate the end of the extension data field 24. Hence, the encoder is configured to insert such a specific bit-pattern. The decoder parses all data until the bit-pattern is found. The bit-pattern may or may not be required to be byte aligned. Then the decoder decodes the slice data 25 starting with the first bit after the specific bit-pattern.

A decoder may perform steps:
(1) The slice header 21 is parsed up until the point where the extension field 24 starts.
(2) From that point the decoder scans the bitstream and searches for the specific bit-pattern (the "start code") that indicates where the extension data 24 ends and the slice data 25 begins.
(3) After the point where the specific bit-pattern is found the decoder parses and decodes the slice.

Thus, in this embodiment the method as disclosed in FIG. 4 further comprises parsing the slice header 21 from a start of the slice header 21 up until a start of the extension field 24 in the slice header 21. The method further comprises scanning the slice header 21 from the start of the extension field 24 until reaching the length indicator 23, which is in the form of a specific start code. The method also comprises identifying an end of the extension field 24 as the specific start code.

In a fifth example embodiment any of first to third example embodiments is used but with the difference that slice_header_extension_length 23 is not signaled in the slice header 21. Instead it is signaled in a data structure which can be referred to by the slice header 21, such as the SPS, VPS, PPS or APS.

In a sixth example embodiment any of the above presented example embodiments is used but with the difference that the length is expressed in bytes instead of bits.

In a seventh example embodiment any of second to sixth example embodiment is used with a bitstream requirement that slice_header_extension_present_flag must be set equal to 0. An encoder may be configured to set the slice_header_extension_present_flag to 0.

In a particular embodiment, an encoder compliant to a certain profile, in particular the base profile, is preferably forced to set slice_header_extension_present_flag to 0. However, a decoder compliant to the same profile must use the length indicator and ignore the extension data.

In an eighth example embodiment any of second to sixth example embodiment is used with a specific meaning introduced for the extension data field 24. Such a meaning can correspond to additional information in a multi-view extension or in a scalable extension.

An encoder may use the example embodiments by setting the slice_header_extension_present_flag to 1 and for each slice header 21 encode values of the extension data field 23 according to the meaning that has been introduced. The encoder is further configured to calculate the length of the extension data field 24 and signal that in the slice_header_extension_length syntax element 23. Alternatively if the length of the extension 24 is known a prior (e.g. a fixed length extension is used) the length can be signaled in the slice_header_extension_length syntax element 23 without first calculating it.

A decoder that recognizes (and makes use of) the introduced meaning for the extension data 24 may be configured to perform the following steps:
(1) The slice_header extension_present_flag from the active SPS is used.
(2) If slice_header_extension_present_flag is equal to 1:
   (a) The slice_header_extension_length syntax element 23 is parsed (or ignored if the extension length is already known).
   (b) The decoder parses and uses the values of slice_header_extension_length number of bits following directly after the slice_header_extension_length syntax element 23 according introduced meaning of the bits.
   (c) The decoder parses and decodes the slice data 25 starting with the first bit that follows after the jump of slice_header_extension_length number of bits (at the bit position where the jump in step b ended).
(3) Otherwise, (slice_header_extension_present_flag is equal to 0), decoder parses and decodes the slice data 25 without parsing a slice_header_extension_length syntax element 23 and without performing a jump in the bitstream 20. Neither the slice_header_extension_length syntax element 23 nor extension data 24 will be present in the slice.

A decoder that does not recognize (or does not make use of) the introduced meaning for the extension data 24 may be configured to perform the steps presented in the second example embodiment.

In a ninth example embodiment, the eighth example embodiment is used with the specific meaning of the extension data field 24 tied to one or more profiles of HEVC. That is, a decoder that decodes a bitstream 20 that conforms to a profile that uses the extension data field 24 for a specific purpose (with a specified meaning) will decode the extension data 24 as described in the eighth embodiment and use the extension data 24 in accordance with the defined meaning.

A decoder that decodes a bitstream 20 that conforms to a profile that does not use the extension data 24 for a specific purpose will perform the steps presented in the second example embodiment.

In a tenth example embodiment any of the second, third, eighth or ninth example embodiment is used but where there is no slice_header_extension_present_Jag, instead it is inferred to be 1. No extension is signaled by signaling a zero extension length.

In an eleventh example embodiment any of the example embodiments above can be used but where the size of the extension 24 is not signaled. Instead a series of fixed and/or variable size variable length codes (VLCs) are defined.

In a twelfth example embodiment two slice header mechanisms could be used for a given slice. In this case, a first length indicator is signaled in a parameter set, such as PPS, whereas a second length indicator is signaled in the slice header. In an embodiment, a flag in the PPS indicates whether the slice header comprises the second length indicator or not.

The PPS RBSP syntax may therefore look like:

| pic_parameter_set_rbsp( ) { | Descriptor |
|---|---|
| ... | |
| num_slice_header_extension_bits | u(5) |
| slice_header_extension_present_flag | u(1) |
| ... | |
| } | |

In this example, num_slice_header_extension_bits represents the first length indicator. A value of this first length indicator equal to 0 specifies that no extra slice header bits are present in the slice header RBSP for coded pictures referring to the PPS. The syntax element num_slice_header_extension_bits should be equal to 0 for bitstreams conforming to base profile specification. The flag slice_header_extension_present_flag is used to signal the presence of the second length indicator in the slice header. A value of 0 of this flag specifies that no slice header extension syntax elements are present in the slice headers for coded pictures referring to the PPS. The flag slice_header_extension_present_flag should be equal to 0 for bitstreams conforming to base profile specification.

The slice layer RBSP syntax may then look like:

```
slice_layer_rbsp( ) {
    slice_header( )
    slice_data( )
    rbsp_slice_trailing_bits( )
}
```

Correspondingly, the slice header syntax would then be as defined below:

| slice_header( ) { | Descriptor |
|---|---|
| ... | |
| for( i = 0; i < num_slice_header_extension_bits; i++ ) | |
|   slice_header_extension_data_flag | u(1) |
| ... | |
| if( slice_header_extension_present_flag ) { | |
|   slice_header_extension_length | ue(v) |
|   for( i = 0; i < slice_header_extension_length; i++ ) | |
|     slice_header_extension_data_byte | u(8) |
| } | |
| byte_alignment( ) | |
| } | |

The first extension field in the slice header is, in this example, made up of the slice_header_extension_data lag. The second length indicator, slice_header_extension_length, specifies the length of the second extension field, i.e. slice_header_extension_data_byte, not including the bits used for signaling slice_header_extension_length itself. In an example, the value of slice_header_extension_length could be in the range of 0 to 256, inclusive. The second extension field in the slice header may have any value.

A thirteenth example embodiment is similar to the twelfths example embodiment disclosed above but with the following slice layer RBSP syntax.

| slice_layer_rbsp( ) { | Descriptor |
|---|---|
| slice_header( ) | |
| slice_data( ) | |
| if( slice_header_extension_present_flag ) { | |
|   slice_extension_flag | u(1) |
|   if( slice_extension_flag ) | |
|     while( more_rbsp_data( ) ) | |
|       slice_extension_data_flag | u(1) |
| } | |
| rbsp_slice_trailing_bits( ) | |
| } | |

In an example implementation of the twelfth and the thirteenth, the base specification could look like:

```
for( i = 0; i < num_slice_beader_extension_bits; i++)
    slice_header_extension_data_flag
```

An extension specification may do this:
inter_layer_prediction_flag inter_layer_prediction_flag equal to 0 indicates that the picture associated with the NAL unit is not used for reference in any picture belonging to a higher spatial or multi-view layer. inter_layer_prediction_flag equal to 1 indicates that the picture associated with the NAL unit may be used for reference in a picture belonging to a higher spatial or multi-view layer.

Thus, in this example implementation the first extension field in the slice header could be interpreted, by a decoder conforming to the extension specification, as indicating inter_layer_prediction_flag.

In an implementation embodiment, the extension field or extension fields in the slice header are interpreted as or replaced by, in the extension specification, actual codewords instead of the extension flag, for instance and with reference to the twelfth and thirteenth example embodiment, slice_header_extension_data_flag and slice_header_extension_data_byte. The codewords may then be in the form of flags, fixed length code (FLC) words, variable length code (VLC) words, or even a mix of them.

It is also possible that an extension-compliant decoder ignores some of the bits in the extension field. For instance, it may the case that the codewords of an extension field would sum up to 12 bits but the total length of the extension field as signaled by the length indicator is set to 14 bits. Then the two remaining bits are simply ignored by the extension compliant decoder.

As mentioned in the foregoing, the extension field 24 could, in an example, comprise encoded multi-view extension data and/or encoded scalable extension data.

In former case, the video stream is a stream of pictures from multiple (camera) views, for instance a right camera view and a left camera view in the case of stereoscopic video. In such a case, one of these multiple. i.e. at least two, views could be a base view with the one or more additional views encoded relative to the base view and possibly each other. However, the base view is preferably independently decodable, i.e. the base view is not using pictures in other views for reference. In such a case, a legacy decoder could correctly decode the base view even if there is extension data relating to the additional views or to the multi-view structure present in the slice headers. This is possible due to the length indicator as used according to the various embodiments as disclosed herein.

In the latter case, the video stream is a stream of pictures from multiple layers. In such a case, one of these multiple layers is the base layer with one or more additional layers.

The base layer is then preferably independently decodable. i.e. without reference to pictures in any of the additional layers. Correspondingly, a picture belonging to additional layer N can preferably reference pictures in the base layer and in layers up to but not above layer N. In such a case, a legacy decoder could correctly decode the base layer even if there is extension data relating to the additional layers or to the multilayer structure present in the slice headers. This is possible due to the length indicator as used according to the various embodiments as disclosed herein.

The embodiments are not limited to HEVC but may be applied to any extension of HEVC, such as a scalable extension or multi-view extension, or to a different video codec, or indeed any other video coding standard.

Figure 9:
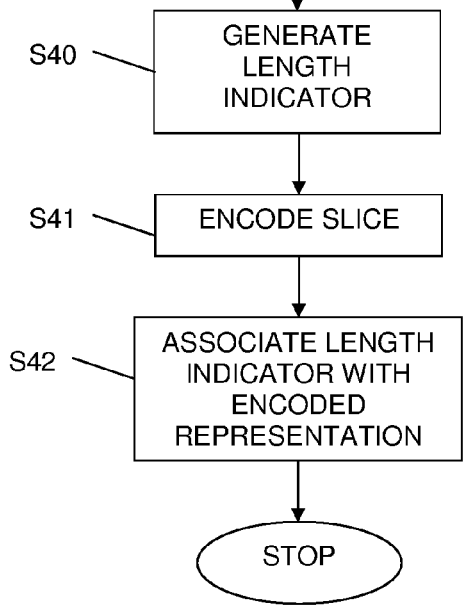
FIG. 9 is a flow diagram of a method of encoding a slice according to an embodiment.

FIG. 9 is a schematic flow diagram of a method of encoding a slice 3 of a picture 2, such as a picture 2 in a video stream 1. The method comprises generating a length indicator 23 in step S40. This length indicator 23 is indicative of a length of an extension field 24 present in a slice header 21 of the slice 3. In a next step S41 the slice 3 is encoded into an encoded representation 20 of the slice 3 comprising the slice header 21 and slice data 25. The length indicator 23 is associated with or to the encoded representation 20 in step S42. Step S42 may be performed prior to, substantially in parallel with or after step S41.

The encoded representation 20 may be further processed to form a NAL unit 11, which optionally may be packaged into a data packet 10 with one or more headers 12 as shown in FIG. 2.

If the slice header is to contain multiple extension fields steps S40 and S42 of FIG. 9 are preferably once for each such extension field.

Figure 10:
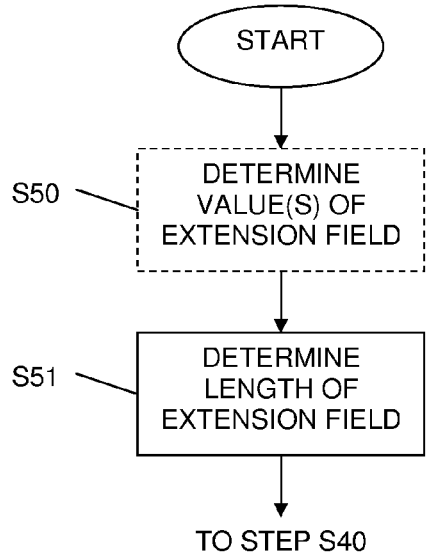
FIG. 10 is a flow diagram illustrating additional, optional steps of the method in FIG. 9 according to an embodiment.

FIG. 10 is a flow diagram illustrating additional, optional steps of the method in FIG. 9. In step S51 a length of the extension field 24 present in the slice header 21 is determined. The length indicator 23 is then generated in step S40 of FIG. 9 based on the length of the extension field 24. Hence, in a particular embodiment the length indicator 23 is given a value that represents the length of the extension field 24 in bytes or bits.

In an optional step S50 the values of the extension field 24 is determined in order to see how long the extension field 24 becomes. Alternatively, the extension field 24 could, depending on what type of extension data, such as multi-view extension data or scalable extension data, have a predefined length. As mentioned previously the values of the extension field 24 preferably represent multi-view extension data and/or scalable extension data for the slice 3.

The length indicator 23 generated in step S40 is preferably inserted into the slice header 21 in step S42. Alternatively, the length indicator 23 could be inserted into a parameter set that applies to the current slice 3. In such a case, the slice header 21 preferably comprises a parameter set identifier enabling identification of the relevant parameter set that comprises the length indicator 23.

If the length indicator 23 is inserted into the slice header 21 in step S42 the length indicator 23 is preferably inserted directly preceding the extension field 24 in the slice header 21.

Figure 11:
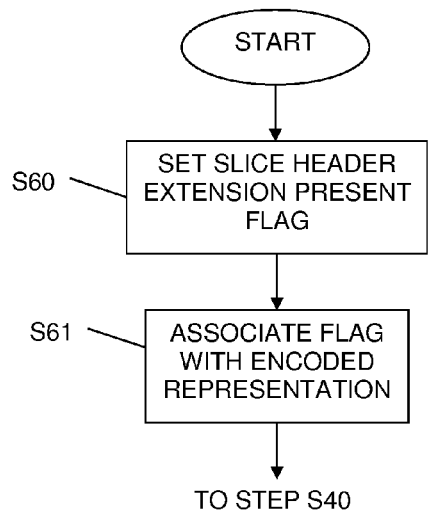
FIG. 11 is a flow diagram illustrating additional, optional steps of the method in FIG. 9 according to another embodiment.

In an embodiment, a slice header extension present flag is used to signal the presence or absence of an extension field 24 in a slice header 21. This embodiment is schematically illustrated in FIG. 11. The method starts in step S60 where the slice header extension present flag is set to a predefined value, such as $1_{bin}$, to indicate presence of the extension field 24 in the slice header 21. In a next step S61 the slice header extension present flag is associated with the encoded representation 20. This association of step S61 could be the insertion of the slice header extension present flag in a parameter set that is applicable to the current slice 3. In such a case, the slice header 21 preferably comprises a parameter set identifier enabling identification of the relevant parameter set that comprises the length indicator 23.

Figure 12:
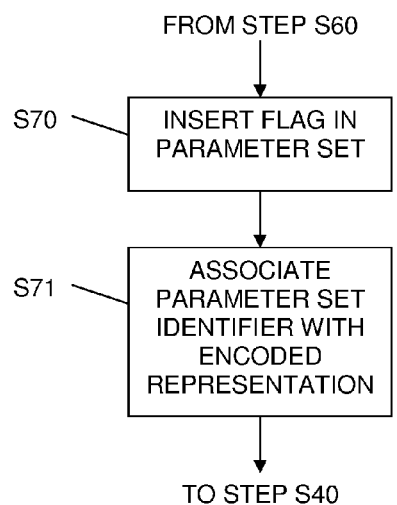
FIG. 12 is a flow diagram illustrating an embodiment of the associating step in FIG. 11.

FIG. 12 illustrates a particular embodiment of the associating step S61 in FIG. 11. In this embodiment the slice header extension present flag is inserted into a parameter set, e.g. a PPS in step S70. A parameter set identifier 26 identifying the parameter set comprising the slice header extension present flag is preferably associated with the encoded representation 20 in step S71, such as by inserting the parameter set identifier 26 into the slice header 21 of the encoded representation 20.

In an alternative approach the slice header extension present flag is inserted into the slice header 21.

Figure 13:
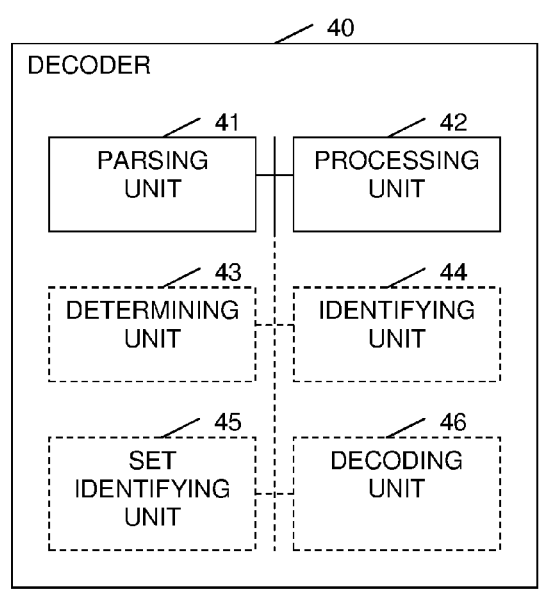
FIG. 13 is a schematic block diagram of a decoder according to an embodiment.

FIG. 13 is a schematic block diagram of a decoder 40 according to an embodiment. The decoder 40 comprises a parsing unit 41, also denoted parser or parsing means or module, configured to parse a length indicator associated with an encoded representation of a slice of a picture. The length indicator is indicative of a length of an extension field present in a slice header of the encoded representation. The decoder 40 also comprises a processing unit 42, also denoted processor or processing means or module, configured to cause the decoder 40 to ignore, during decoding of the encoded representation, any value of the extension field identified based on the length indicator.

In an optional embodiment, the decoder 40 also comprises a determining unit 43, also denoted determiner or determining means or module, configured to determine a length of the extension field based on the length indicator. An optional identifying unit 44, also denoted identifier or identifying means or module, of the decoder 40 is preferably configured to identify an end of the extension field in the slice header based on the length as determined by the determining unit 43.

The parsing unit 41 is preferably configured to parse the length indicator present in the slice header of the encoded representation. Alternatively, the parsing unit 41 could parse the length indicator in a parameter set identified based on a parameter set identifier parsed in the slice header of the encoded representation. In this latter case, the parsing unit 41 could, if the parameter set with the length indicator already has been parsed and decoded for a previously encoded representation, retrieve the length indicator form an associated memory as previously disclosed herein.

In an optional embodiment the processing unit 42 is configured to cause the decoder 40 to ignore, during decoding of the encoded representation, any value of the extension field directly following the length indicator in the slice header and up to an end of the extension field as identified based on the length indicator, for instance by the identifying unit 44.

The parsing unit 41 is preferably configured also to parse a slice header extension flag associated with the encoded representation. In such a case, the parsing unit 41 is configured to parse the length indicator and the processing unit 42 is configured to cause the decoder 40 to ignore any value of the extension field if the slice header extension flag has a predefined value, preferably $1_{bin}$.

In an optional embodiment the decoder 40 further comprises a set identifying unit 45, also denoted set identifier or set identifying means or module, configured to identify a parameter set, preferably a PPS, associated with the encoded representation based on a parameter set identifier, preferably a PPS identifier, obtainable based on the slice header. In a particular embodiment, the set identifying unit 45 preferably retrieves the parameter set identifier from the slice header of the encoded representation and uses it to identify the relevant parameter set carrying the slice header extension present flag. In such a case, the parsing unit 41 is configured to parse the slice header extension present flag present in the parameter set, preferably PPS, as identified by the set identifying unit 45.

The previously mentioned identifying unit 44 is in an optional embodiment configured to identify a start of slice data in the encoded representation based on an end of the extension field as identified based on the length indicator, for instance by the identifying unit 44. The decoder 40 then comprises a decoding unit 46, also denoted data decoder or decoding means or module, configured to parse and decode the slice data starting from the start of the slice data as identified by the identifying unit 44.

The decoding unit 46 is preferably configured to parse and decode the slice data by ignoring and thereby not using any value of the extension field in the slice header. Hence, the decoding unit 46 performs the decoding of the encoded representation 20 without using any value in or represented by the extension field.

In a particular embodiment the decoder 40 comprises a unit 41 for parsing a flag indicating whether a length indicator for indicating the length of the slice header is used. Further, the decoder 40 comprises a unit 41 for parsing the length indicator and based on that determine the length of an extension field in the slice header. The decoder 40 can then use that information when decoding the encoded NAL unit.

Figure 14:
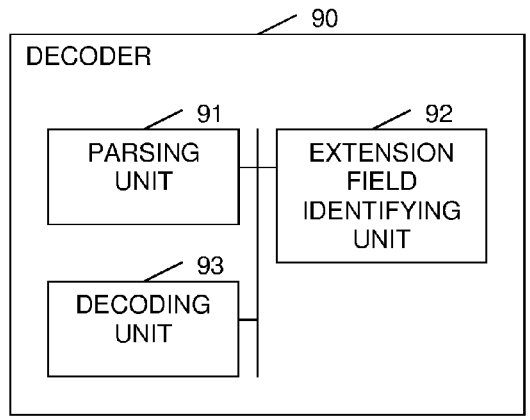
FIG. 14 is a schematic block diagram of a decoder according to another embodiment.

FIG. 14 is a schematic block diagram of a decoder 90 according to another embodiment for decoding an encoded representation of a slice of a picture. The decoder 90 comprises a parsing unit 91, also denoted parser or parsing means or module, configured to parse a length indicator associated with the encoded representation. The length indicator is indicative of a length of an extension field present in a slice header of the encoded representation. An extension field identifying unit 92, also denoted extension field identifier or identifying means or module, is configured to identify the extension field in the slice header based on the length indicator parsed by the parsing unit 91. The decoder 90 also comprises a decoding unit 93, also denoted data decoder or decoding means or module. This decoding unit 93 is configured to decode the encoded representation of the slice based on at least one value of the extension field in the slice header identified by the extension field identifying unit 92.

The decoders 40, 90 of FIGS. 13 and 14 with their including units 41-46, 91-93 could be implemented in hardware. There are numerous variants of circuitry elements that can be used and combined to achieve the functions of the units 41-46, 91-93 of the decoder 40, 90. Such variants are encompassed by the embodiments. Particular examples of hardware implementation of the decoder 40, 90 is implementation in digital signal processor (DSP) hardware and integrated circuit technology, including both general-purpose electronic circuitry and application-specific circuitry.

Figure 15:
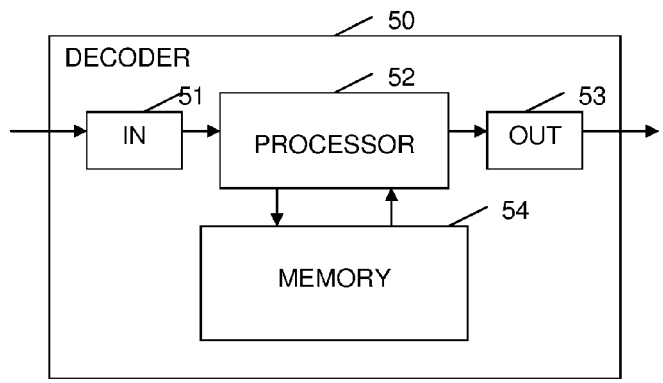
FIG. 15 is a schematic block diagram of a decoder according to a further embodiment.

The decoder 50 described herein could alternatively be implemented e.g. by one or more of a processor 52 and adequate software with suitable storage or memory 54 therefore, a programmable logic device (PLD) or other electronic component(s) as shown in FIG. 15. In addition, the decoder 50 preferably comprises an input or input unit 51 configured to receive the encoded representations of slices, such as in the form of NAL units. A corresponding output or output unit 53 is configured to output the decoded slices.

Figure 16:
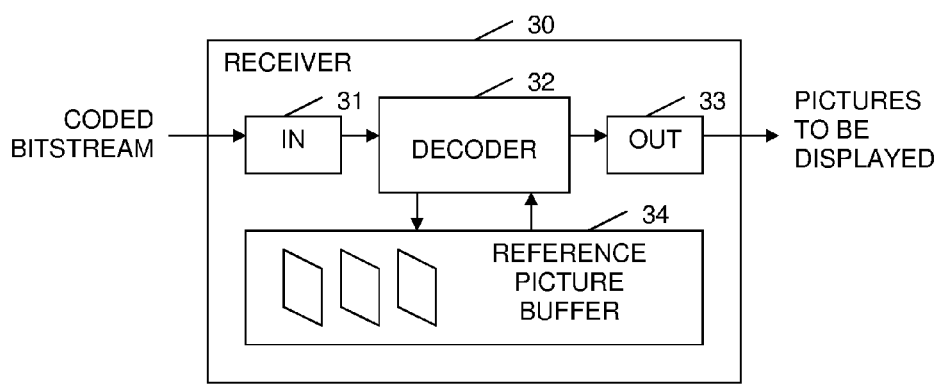
FIG. 16 is a schematic block diagram of a receiver according to an embodiment.

The decoder 32 can, for example, be located in a receiver 30, such as in a video camera, set-top-box or a display, e.g. in a mobile device as shown in FIG. 16. The receiver 30 then comprises an input or input unit 31 configured to receive a coded bitstream, such as data packets of NAL units as shown in FIG. 2. The encoded representations of the NAL units are decoded by the decoder 32 as disclosed herein. The decoder 32 preferably comprises or is connected to a reference picture buffer 34 that temporarily stores already decoded pictures that are to be used as reference pictures for other pictures in the video stream. Decoded pictures are output from the receiver 30, such as from the reference picture buffer 34, by means of an output or output unit 33. These output pictures are sent to be displayed to a user on a screen or display of or connected, including wirelessly connected, to the receiver 30.

An embodiment therefore relates to a receiver 30 comprising a decoder for decoding an encoded representation of a slice of a picture. The encoded representation comprises a slice header and slice data. The decoder of the receiver comprises a parsing unit configured to parse a length indicator associated with the encoded representation and indicative of a length of an extension field in the slice header. The decoder also comprises a processing unit configured to cause the decoder to ignore, during, decoding of the encoded representation, any value of the extension field identified based on the length indicator.

Another embodiment relates to a receiver 30 comprising a decoder for decoding an encoded representation of a slice of a picture. The encoded representation comprises a slice header and slice data. The decoder of the receiver comprises a parsing unit configured to parse a length indicator associated with the encoded representation and indicative of a length of an extension field in the slice header. The decoder also comprises an extension field identifying unit configured to identify the extension field in the slice header based on the length indicator. A decoding unit of the decoder is configured to decode the encoded representation of the slice based on at least one value of the extension field in the slice header identified by the extension field identifying unit.

Figure 17:
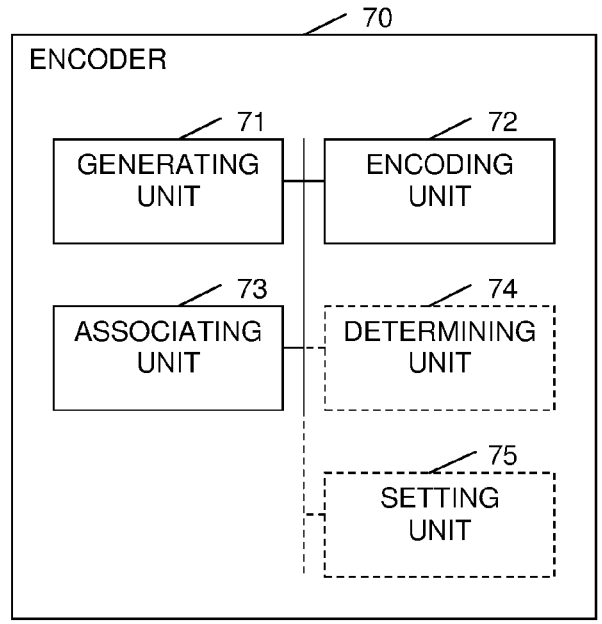
FIG. 17 is a schematic block diagram of an encoder according to an embodiment.

FIG. 17 is a schematic block diagram of an encoder 70 configured to encode a slice of a picture according to an embodiment. The encoder 70 comprises a generating unit 71, also denoted generator or generating means or module, configured to generate a length indicator indicative of a length of an extension field present in a slice header of the slice. An encoding unit 72, also denoted slice encoder or encoding means or module, of the encoder 70 is configured to encode the slice into an encoded representation of the slice comprising the slice header and slice data. The encoder 70 also comprises an associating unit 73, also denoted associator or associating means or module, configured to associate the length indicator with the encoded representation.

In an optional embodiment the encoder 70 comprises a determining unit 74, also denoted determiner or determining means or module, configured to determine a length of the extension field present in the slice header. The generating unit 71 is then configured to generate the length indicator based on the length of the extension field as determined by the determining unit 74.

An optional embodiment has an associating unit 73 that is configured to insert the length indicator in the slice header, preferably prior to the encoding unit 72 encoding the slice.

In such a case, the associating unit 73 preferably inserts the length indicator directly preceding the extension field in the slice header.

The encoder 70 comprises in an optional embodiment a setting unit 75, also denoted setter or setting means or module, configured to set a slice header extension present flag to a predefined value, preferably $1_{bin}$, to indicate the presence of the extension field in the slice header. The associating unit 73 is then configured to associate the slice header extension present flag to the encoded representation. In a particular embodiment, the associating unit 73 is configured to insert the slice header extension present flag in a parameter set, preferably PPS. The associating unit 73 is further configured to associate a parameter set identifier, preferably PPS identifier, identifying the parameter set, preferably PPS, with the encoded representation. In particular, the associating unit 73 is configured to insert the parameter set identifier, preferably PPS identifier, into the slice header.

In a particular embodiment, the encoder 70 comprises a unit 74 for determining the length of an extension field in the slice header and a unit 73 for inserting a length indicator.

The encoder 70 of FIG. 17 with its including units 71-75 could be implemented in hardware. There are numerous variants of circuitry elements that can be used and combined to achieve the functions of the units 71-75 of the encoder 70. Such variants are encompassed by the embodiments. Particular examples of hardware implementation of the encoder 70 is implementation in digital signal processor (DSP) hardware and integrated circuit technology, including both general-purpose electronic circuitry and application-specific circuitry.

Figure 18:
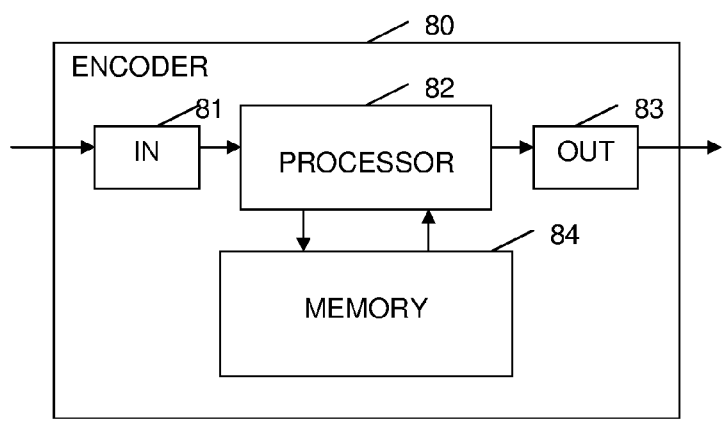
FIG. 18 is a schematic block diagram of an encoder according to another embodiment.

The encoder 80 described herein could alternatively be implemented e.g. by one or more of a processor 82 and adequate software with suitable storage or memory 84 therefore, a programmable logic device (PLD) or other electronic component(s) as shown in FIG. 18. In addition, the encoder 80 preferably comprises an input or input unit 81 configured to receive the pictures of the video stream. A corresponding output or output unit 83 is configured to output the encoded representations of the slices, preferably in the form of NAL units.

Figure 19:
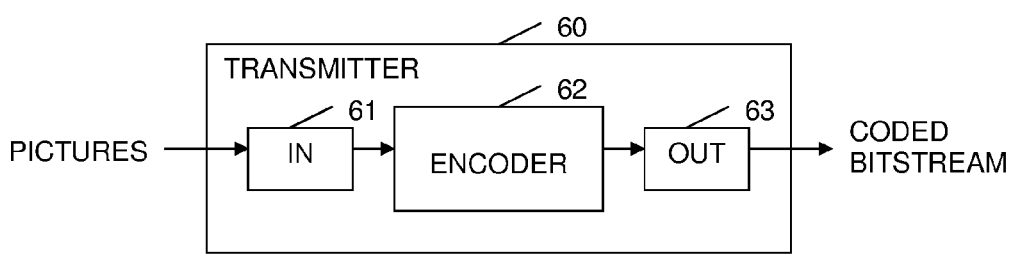
FIG. 19 is a schematic block diagram of a transmitter according to an embodiment.

The encoder 62 can, for example, be located in a transmitter 60 in a video camera e.g. in a mobile device as shown in FIG. 19. The transmitter 60 then comprises an input or input unit 61 configured to receive pictures of a video stream to be encoded. The pictures are encoded by the encoder 62 as disclosed herein. Encoded pictures are output from the transmitter 60 by an output or output unit 63 in the form of a coded bitstream, such as of NAL units or data packets carrying such NAL units as shown in FIG. 2.

An embodiment relates to a transmitter 60 comprising an encoder for encoding a slice of a picture. The encoder comprises a generating unit configured to generate a length indicator indicative of a length of an extension field present in the slice header of the slice. The encoder also comprises an encoding unit configured to encode the slice into an encoded representation of the slice comprising the slice header and slice data. An associating unit of the encoder is configured to associate the length indicator with the encoded representation.

The embodiments apply to a decoder, an encoder and any element that operates on a bitstream, such as a network-node or a Media Aware Network Element.

It is to be understood that the choice of interacting units or modules, as well as the naming of the units are only for exemplary purpose, and may be configured in a plurality of alternative ways in order to be able to execute the disclosed process actions.

It should also be noted that the units or modules described in this disclosure are to be regarded as logical entities and not with necessity as separate physical entities. It will be appreciated that the scope of the technology disclosed herein fully encompasses other embodiments which may become obvious to those skilled in the art, and that the scope of this disclosure is accordingly not to be limited.

Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In the preceding description, for purposes of explanation and not limitation, specific details are set forth such as particular architectures, interfaces, techniques, etc. in order to provide a thorough understanding of the disclosed technology. However, it will be apparent to those skilled in the art that the disclosed technology may be practiced in other embodiments and/or combinations of embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The functions of the various elements including functional blocks may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Figure 20:
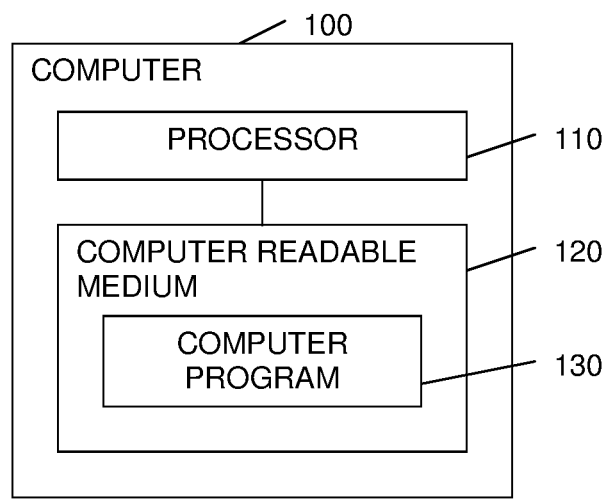
FIG. 20 is a schematic block diagram of a computer comprising a computer readable medium and a computer program according to an embodiment.

FIG. 20 is a schematic illustration of a computer 100 comprising a processor 110 and a computer readable medium 120 having stored therein a computer program 130.

In an embodiment, the computer program 130 is configured for decoding an encoded representation of a slice of a picture. The encoded representation comprises a slice header and slice data. The computer program 130 comprises code means which when run by the processor 110 causes the processor 110 to parse a length indicator associated with the encoded representation and indicative of a length of an extension field in the slice header. The processor 110 is also caused to determine to ignore, during decoding of the encoded representation, any value of said extension field identified based on the length indicator.

In another embodiment, the computer program 130 is configured for decoding an encoded representation of a slice of a picture. The encoded representation comprises a slice header and slice data. The computer program 130 comprises code means which when run by the processor 110 causes the processor 110 to parse a length indicator associated with the encoded representation and indicative of a length of an extension field in the slice header. The processor 110 is also caused to identify, based on the length indicator, the extension field in said slice header and decode the encoded representation of the slice based on at least one value of the extension field identified based on the length indicator.

In a further embodiment, the computer program 130 is configured for encoding a slice of a picture. The computer program 130 comprises code means which when run by the processor 110 causes the processor 110 to generate a length indicator indicative of a length of an extension field present in a slice header of the slice. The processor 110 is also caused to encode the slice into an encoded representation of the slice comprising the slice header and slice data. The processor 110 is further caused to associate the length indicator with the encoded representation.

An embodiment relates to a computer program product comprising computer readable medium 120 and a computer program 130 as defined according to any of the above disclosed embodiments stored on the computer readable medium 120.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A decoding apparatus for decoding an encoded representation of a slice of a picture, said encoded representation comprising a slice header and slice data, said decoding apparatus being configured to:
   parse a length indicator associated with said encoded representation and indicative of a length of an extension field in said slice header; and
   cause said decoder to ignore, during decoding of said encoded representation, any value of said extension field identified based on said length indicator.

2. The decoding apparatus of claim 1, wherein the decoding apparatus is further configured to:
   determine a length of said extension field based on said length indicator; and
   identify an end of said extension field in said slice header based on said length.

3. The decoding apparatus of claim 1, wherein said decoding apparatus is configured to parse said length indicator present in said slice header.

4. The decoding apparatus of claim 1, wherein said decoding apparatus is configured to ignore, during decoding of said encoded representation, any value of said extension field directly following said length indicator in said slice header up to an end of said extension field as identified based on said length indicator.

5. The decoding apparatus of claim 1, wherein said decoding apparatus is configured to parse said length indicator present in a parameter set identified based on a parameter set identifier obtainable based on said slice header.

6. The decoding apparatus of claim 1, wherein said decoding apparatus is further configured to:
   parse a slice header extension present flag associated with said encoded representation;
   parse said length indicator;
   ignore said any value if said slice header extension present flag has a predefined value.

7. The decoding apparatus of claim 6, wherein said decoding apparatus is further configured to:
   identify a parameter set associated with said encoded representation based on a parameter set identifier obtainable based on said slice header, and
   parse said slice header extension present flag present in said parameter set.

8. The decoding apparatus of claim 1, wherein said decoding apparatus is further configured to:
   identify a start of said slice data based on an end of said extension field as identified based on length indicator; and
   parse and decode said slice data starting from said start of said slice data.

9. The decoding apparatus of claim 8, wherein said decoding apparatus is configured to parse and decode said slice data by ignoring said any value of said extension field in said slice header.

10. A communication device comprising:
    a receiver; and
    the decoding apparatus of claim 1.

11. A decoding apparatus for decoding an encoded representation of a slice of a picture, said encoded representation comprising a slice header and slice data, said decoding apparatus being configured to:
    parse a length indicator associated with said encoded representation and indicative of a length of an extension field in said slice header;
    identify said extension field in said slice header based on said length indicator; and
    decode said encoded representation of said slice based on at least one value of said extension field identified by said extension field identifying unit.

12. A communication device comprising:
    a receiver; and
    the decoding apparatus of claim 11.

13. An encoding apparatus for encoding a slice of a picture, said encoding apparatus being configured to:
    generate a length indicator indicative of a length of an extension field present in a slice header of said slice;
    encode said slice into an encoded representation of said slice comprising said slice header and slice data; and
    associate said length indicator with said encoded representation.

14. The encoding apparatus of claim 13, further comprising:
a determining unit configured to determine a length of said extension field present in said slice header, wherein said generating unit is configured to generate said length indicator based on said length of said extension field.

15. The encoding apparatus of claim 13, wherein said associating unit is configured to insert said length indicator into said slice header.

16. The encoding apparatus of claim 15, wherein said associating unit is configured to insert said length indicator directly preceding said extension field in said slice header.

17. The encoding apparatus of claim 13, wherein said associating unit is configured to insert said length indicator into a parameter set and associating a parameter set identifier identifying said parameter set with said encoded representation.

18. The encoding apparatus of claim 13, further comprising:
a setting unit configured to set a slice header extension present flag to a predefined value to indicate presence of said extension field in said slice header, wherein said associating unit is configured to associate said slice header extension present flag with said encoded representation.

19. The encoding apparatus of claim 18, wherein associating unit is configured to insert said slice header extension present flag into a parameter set and associate a parameter set identifier identifying said parameter set with said encoded representation.

20. A communication device comprising:
a transmitter; and
the encoding apparatus of claim 13.

21. A decoding apparatus, comprising:
a memory; and
processing circuitry coupled to the memory and being configured to:
obtain an encoded representation of a slice of a picture, said encoded representation comprising a slice header and slice data immediately following the slice header, and said slice header comprising a variable length header extension data field storing extension data;
based on information associated with said encoded representation, determine an ending position of the variable length header extension data field; and
after determining the ending position of the variable length header extension data field, ignore all of the extension data contained within the variable length header extension data field.

22. The decoding apparatus of claim 21, wherein
said slice header further comprises a variable length header extension length field immediately preceding the variable length header extension data field,
said information associated with said encoded representation comprises an encoded length value stored in the variable length header extension length field, wherein the encoded length value identifies X number of sequential bytes, X>0; and
the decoding apparatus is configured to ignore all of the extension data contained within the variable length header extension data field by ignoring the X number of bytes that immediately follow the header extension length field.

* * * * *

UNITED STATES PATENT AND TRADEMARK OFFICE
CERTIFICATE OF CORRECTION

| | |
|---|---|
| PATENT NO. | : 9,973,760 B2 |
| APPLICATION NO. | : 15/371819 |
| DATED | : May 15, 2018 |
| INVENTOR(S) | : Samuelsson et al. |

Page 1 of 1

It is certified that error appears in the above-identified patent and that said Letters Patent is hereby corrected as shown below:

In Column 4, Line 61, delete "FIG. 11:" and insert -- FIG. 11; --, therefor.

In Column 7, Line 65, delete "data." and insert -- data, --, therefor.

In Column 11, in Table, Line 5, delete "_length;++)" and insert -- _length; i++) --, therefor.

In Column 12, Line 19, delete "field 24." and insert -- field 24, --, therefor.

In Column 14, Line 54, delete "(syntax element)." and insert -- (syntax element), --, therefor.

In Column 15, Line 50, delete "_present flag" and insert -- _present_flag --, therefor.

In Column 16, Line 5, delete "_present_lag" and insert -- _present_flag --, therefor.

In Column 18, Line 17, delete "slice_header extension_" and insert -- slice_header_extension_ --, therefor.

In Column 18, Line 58, delete "_present_Jag," and insert -- _present_flag, --, therefor.

In Column 19, Line 56, delete "_data lag." and insert -- _data_flag. --, therefor.

In Column 20, Line 16, delete "_slice_beader_extension_" and insert -- _slice_header_extension_ --, therefor.

In Column 20, Line 54, delete "multiple." and insert -- multiple, --, therefor.

In Column 21, Line 1, delete "decodable." and insert -- decodable, --, therefor.

In Column 22, Line 48, delete "form" and insert -- from --, therefor.

Signed and Sealed this
Eleventh Day of September, 2018

Andrei Iancu
*Director of the United States Patent and Trademark Office*